United States Patent [19]
Landry

[11] Patent Number: 5,829,384
[45] Date of Patent: Nov. 3, 1998

[54] BIRD FEEDER

[76] Inventor: Alfred E. Landry, 52 Bayberry Cir., Liverpool, N.Y. 13090

[21] Appl. No.: 995,926

[22] Filed: Dec. 22, 1997

[51] Int. Cl.⁶ .................................................. A01K 39/01
[52] U.S. Cl. ............................................................ 119/52.3
[58] Field of Search .................................. 119/52.2, 52.3, 119/57.8, 57.9

[56] References Cited

U.S. PATENT DOCUMENTS

| | | | |
|---|---|---|---|
| 5,289,796 | 3/1994 | Armstrong | 119/52.3 |
| 5,291,855 | 3/1994 | Laverty | 119/52.3 |
| 5,558,040 | 9/1996 | Colwell et al. | 119/52.2 |

*Primary Examiner*—Robert P. Swiatek
*Assistant Examiner*—James S. Bergin
*Attorney, Agent, or Firm*—George R. McGuire

[57] ABSTRACT

A bird feeder adapted to be suspended from the branch of a tree. The bird feeder includes a tube assembly (including a lower tube and an upper tube telescopically engaged therein) and a base plate extending radially outwardly therefrom and on which a feed holding can is mounted. A cone is fixedly attached to the upper tube and positioned in vertically spaced relation above the base plate, thereby serving as a hood to the base plate and feed holding can. The cone and upper tube are supported in position by a series of elongated, resilient tines which are fixedly secured at one end to the can and with their opposite ends being in contacting, supporting relation to the inwardly facing surface of the cone. The tines permit the cone together with the upper tube, to be forced downwardly along the longitudinal axis of the tube assembly in the event of a squirrel climbing on it trying to gain access to the feed, thereby denying the squirrel access to the feed. The bird feeder further includes a hoop which is positioned on the base plate in circumferentially surrounding relation to the can, thereby serving as a barrier to minimize the amount of feed sliding off the base plate. In addition, a funnel is positioned upside down within the feed can to divert the feed through openings formed through portions of the can positioned adjacent the base plate.

14 Claims, 4 Drawing Sheets

BIRD FEEDER

BACKGROUND OF THE INVENTION

The present invention relates to bird feeders, and more particularly to bird feeders that are suspended from tree branches, commonly referred to as clinging type bird feeders.

Several species of birds prefer to feed from the branches of trees or bushes while clinging thereto. Therefore, in order to observe such types of birds, enthusiasts will suspend some form of bird feeder from the branches of a readily observable tree or bush. The prior art bird feeders of this type commonly include a base plate on which bird feed is placed and to which a bird may cling; a hood positioned in covering, vertically spaced relation to the base plate which protects the feed from weather elements, such as rain and snow, and which prevents other animals, such as squirrels, from gaining access to the feed; and a wire or thin metal tube which passes through the base plate and hood and suspends them from a tree branch. Other elements commonly associated with prior art bird feeders include mechanisms to prevent the feed from spilling off the base plate and prevent feed from being blown off the plate by the wind. Representative examples of prior art bird feeders having some or all of the above described features can be readily seen in U.S. Pat. Nos. 3,090,354 to Merritt et al.; 4,102,308 to Kilham; 5,086,730 to Figley; 5,289,796 to Armstrong; 5,291,855 to Laverty; and 5,558,040 to Colwell et al.

Although the prior art provides functionally adequate apparatus for feeding birds, squirrels and other particularly agile animals tend to gain access to the feed despite the measures taken to prevent such an encroachment. By grasping onto a hood overhanging the feed plate and suspending themselves from their hind legs, squirrels and the like bypass the hood and gain access to the feed.

It is therefore a principal object and advantage of the present invention to provide a clinging type bird feeder having an improved hood assembly for, among other things, preventing squirrels and the like from gaining access to the feed.

It is another object and advantage of the present invention to provide a clinging type bird feeder with improved feed retention on the base plate.

It is a further object and advantage of the present invention to provide a clinging type bird feeder that is easily and inexpensively manufactured.

It is an additional object of the present invention to provide a clinging type bird feeder that is weather-proof under normal weather conditions.

Other objects and advantages of the present invention will, in part, be obvious, and, in part, appear hereinafter.

SUMMARY OF THE INVENTION

In accordance with the foregoing objects and advantages, the present invention provides a bird feeder which is suspended from a tree branch in an elevated position above the ground. The bird feeder of the present invention is generally comprised of a base plate having a feed holding can concentrically mounted thereon and with an elongated tube assembly extending concentrically therethrough. The tube assembly includes a lower tube and an upper tube of smaller diameter than and in telescopically engaging relation to the upper tube. A wire or thin metal rod passes through the tube assembly and may be tied or hooked to a tree branch in order to suspend the bird feeder therefrom.

The bird feeder further includes a downwardly facing cone, preferably fabricated from aluminum, concentrically positioned and fixedly secured to the upper tube and in longitudinally, vertically spaced relation above the base plate. The cone is maintained in its elevated position by a series of tines which extend radially outwardly in a downwardly sloping direction from the tube assembly into engaging relation with the inwardly facing surface of the cone. The tines have resilient, spring-like qualities and include rollers rotatably attached to their ends which are positioned in contacting, sliding relation to the cone. This permits the cone, together with the upper tube, to slide along the longitudinal axis of the lower tube. Accordingly, if the cone assembly experiences a downward force, as would be the case if a squirrel were to attempt accessing the feed, the upper tube and cone will slide downwardly along the lower tube. If the force is above a predetermined amount (i.e., the weight of an average squirrel) the cone will become positioned in complete covering relation to the base plate, thereby physically denying access to the feed positioned on the base plate.

Another element of the bird feeder is a downwardly facing funnel positioned inside the feed can. The funnel directs feed through openings formed through portions of the can positioned adjacent the base plate.

An additional feature of the present bird feeder is a cylindrical hoop fixedly secured to the base plate by a plurality of nails in circumferentially surrounding and concentric relation to the feed can. The hoop minimizes the amount of feed falling off the base plate.

BRIEF DESCRIPTION OF THE DRAWINGS

The present invention will be further understood when reading the Detailed Description in conjunction with the Drawing Figures, wherein.

DETAILED DESCRIPTION

Figure 1A:
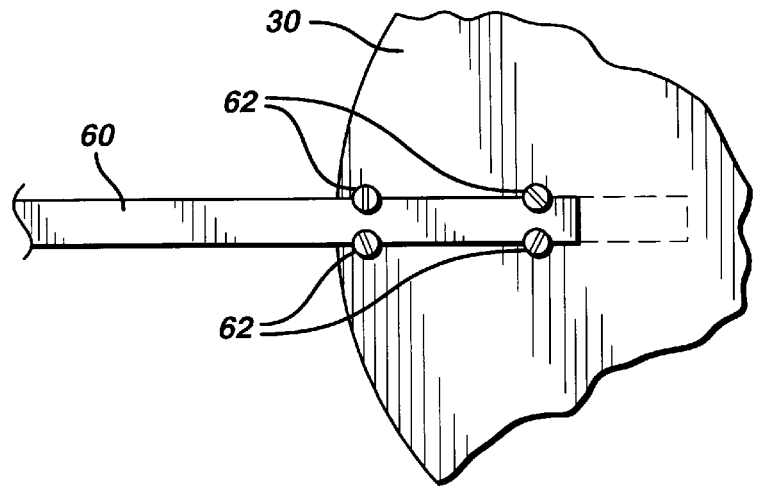
FIG. 1a is an enlarged perspective of the resilient tines which form part of the present invention.
Figure 1:
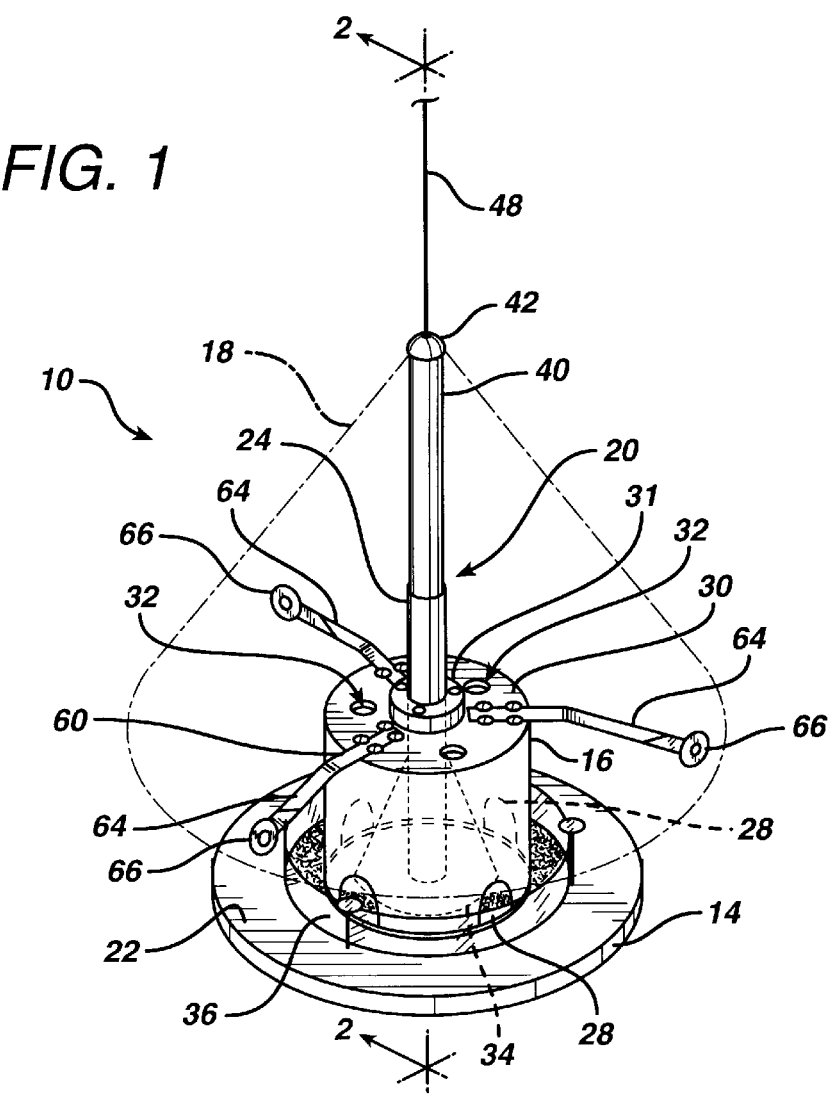
FIG. 1 is a perspective view of the present invention with the cone being shown in phantom.
Figure 2:
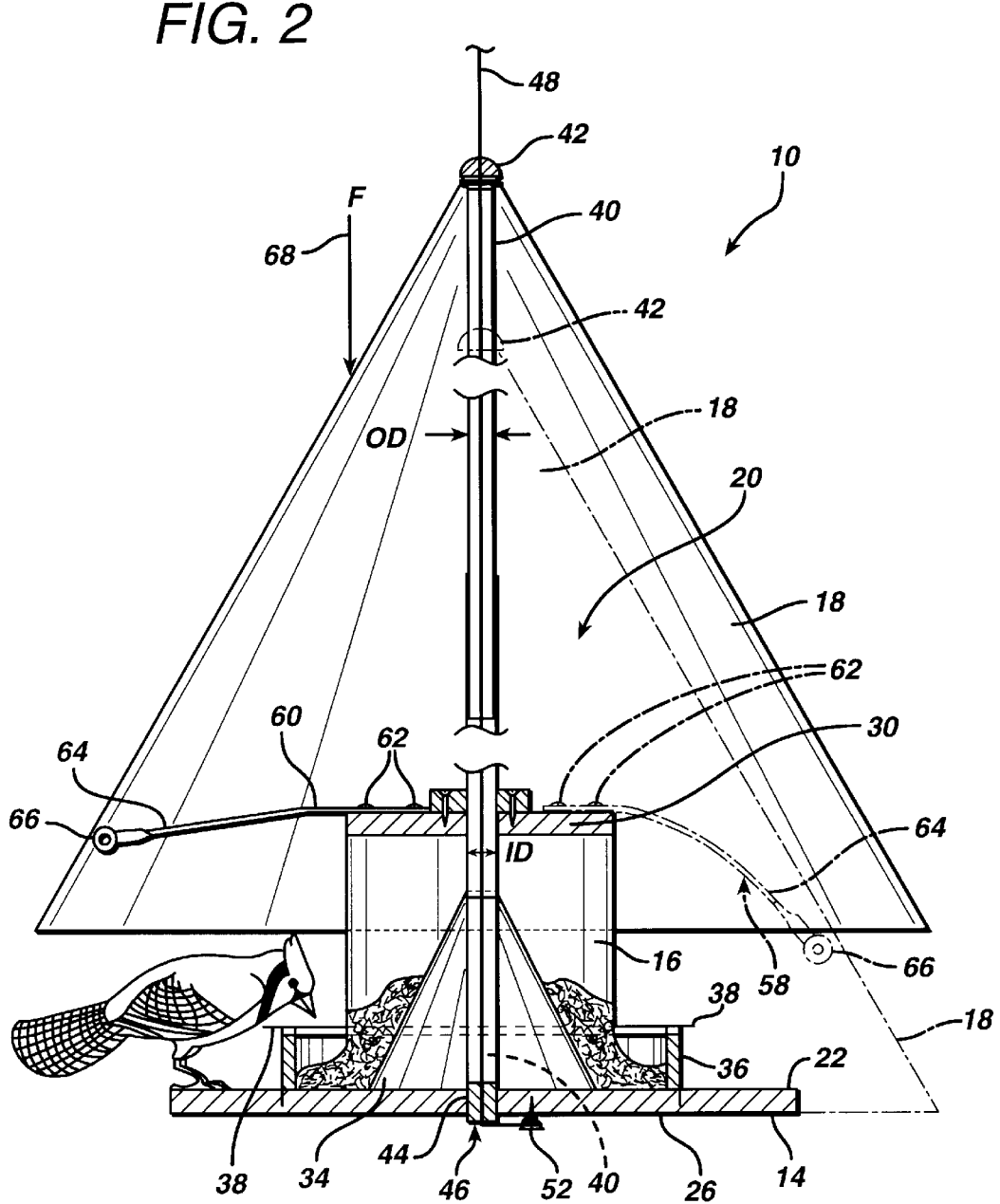
FIG. 2 is a cross-sectional view of the present invention taken along line 2—2 of FIG. 1.
Figure 3:
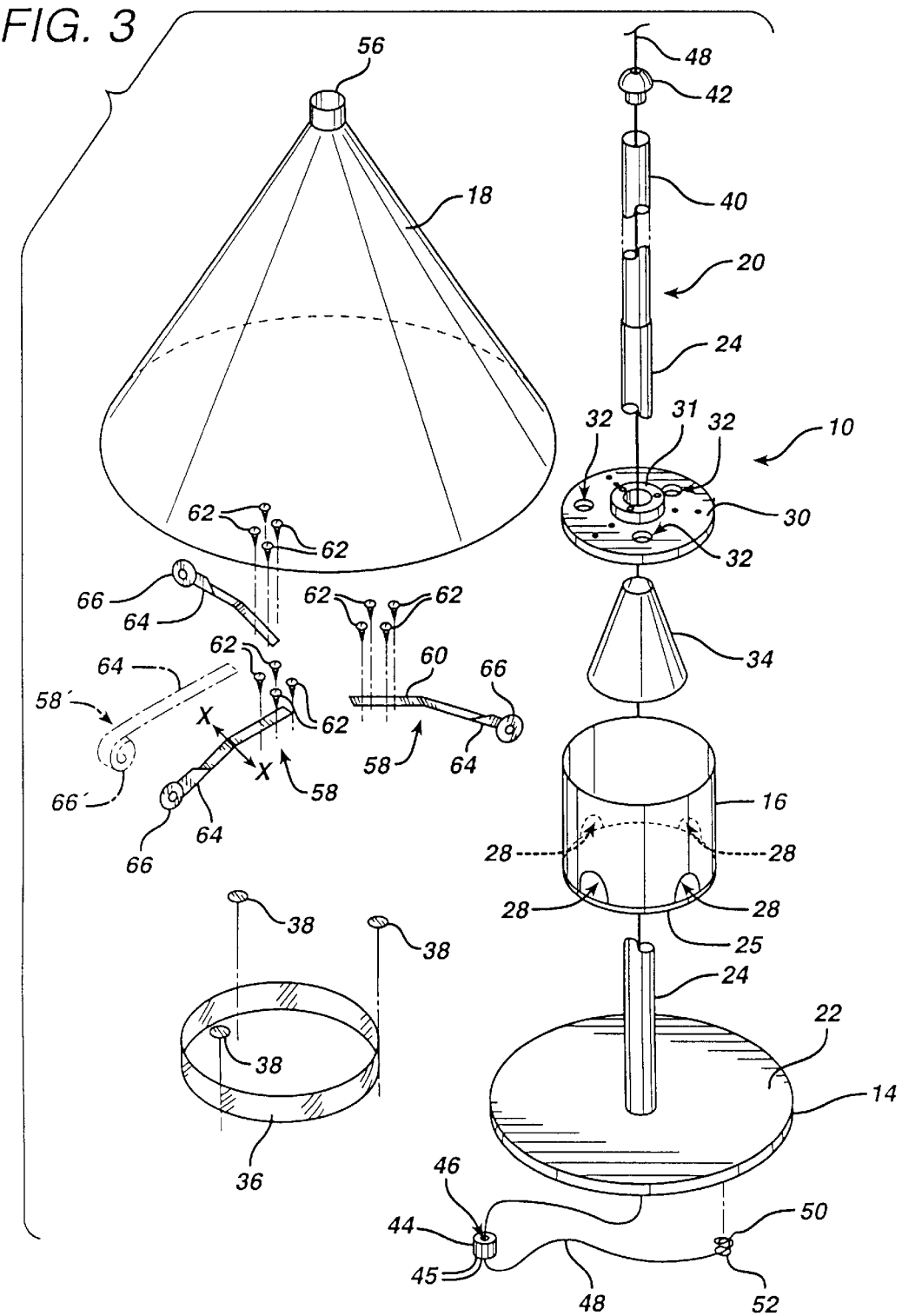
FIG. 3 is an exploded perspective view of the present invention.
Figure 4:
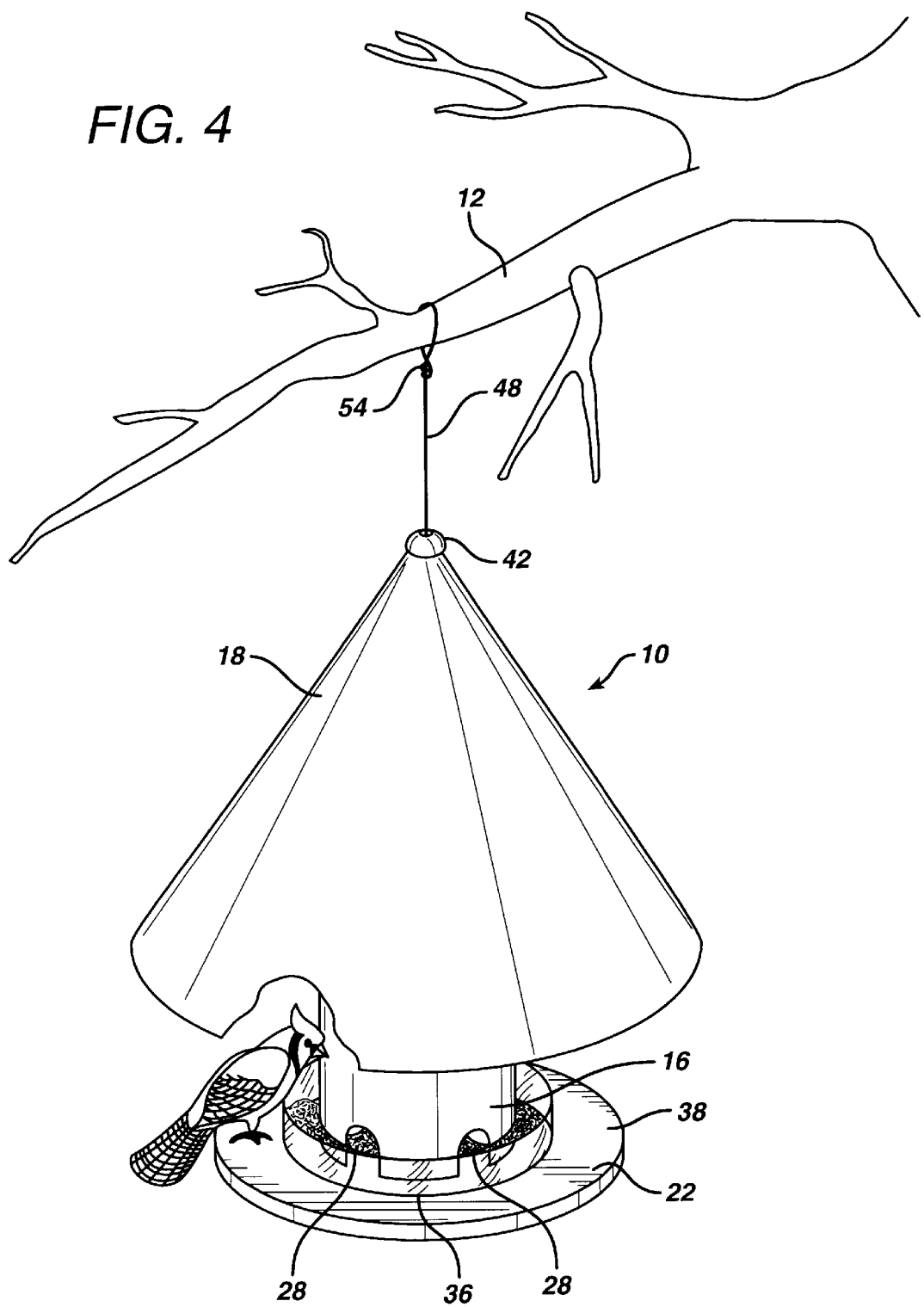
FIG. 4 is a perspective view of the present invention in use.

Referring now to the drawings, wherein like reference numerals refer to like parts throughout, there is seen in FIGS. 1–4 a bird feeder, designated generally by reference numeral 10, suspended from a tree branch 12 (see FIG. 4) in an elevated position above the ground. Bird feeder 10 is generally comprised of a preferably circularly shaped, planar base plate 14, a cylindrical feed can 16 concentrically mounted atop plate 14, and a cone 18 positioned in vertically spaced relation above plate 14, and with its sidewall sloping outwardly and downwardly. Each of the bird feeder elements extend radially outwardly from an elongated tube assembly, denoted generally by reference numeral 20.

More specifically, plate 14 includes a planar, upwardly facing surface 22 and an aperture (not shown) extending concentrically therethrough. Tube assembly 20 includes a lower tube 24 having an inner diameter ID and extending perpendicularly upwardly through the aperture formed through plate 14. The bottom end of tube 24 is essentially flush with the bottom surface 26 of plate 14 which extends radially outwardly from tube 24.

Feed can 16 is securely mounted concentrically upon, and extends perpendicularly upwardly from upper surface 22 of plate 14. A series of circumferentially spaced openings 28 are formed through the sidewall of can 16 adjacent its lower, closed end 25 which sits upon upper surface 22. Openings 28 permit feed deposited in can 16 to escape therefrom and become accessible to birds.

A lid 30 is removably positioned in covering relation atop can 16 and includes a knob 31 extending upwardly therefrom and a series of finger holes 32 formed therethrough. Knob 31 and holes 32 permit easy removal of the lid from can 16 for purposes of replenishing the feed supply. In order to ensure that the feed is dispensed through openings 28, a funnel 34 is concentrically positioned within can 16 with its sides sloping outwardly and downwardly towards openings 28. Therefore, as feed is fed into can 16, funnel 34 diverts it towards and through holes 28.

To minimize the amount of the feed spilling off plate 14 due to wind, a tilting of bird feeder 10, or the like, a cylindrically shaped hoop 36 is positioned in concentric, circumferentially surrounding relation to can 16, thereby acting as a barrier to the seed while not prohibiting birds from gaining access thereto. A series of nails or screws 38, circumferentially spaced at predetermined intervals around hoop 36, are used to secure hoop 36 to plate 14.

Tube assembly 20 includes lower tube 24 and a second tube 40 which has an outer diameter OD slightly less than the ID of tube 24, to permit tube 40 to freely, longitudinally telescope within tube 24. A cap 42 having an aperture (not shown) formed centrally therethrough is fixedly secured, by cementing for instance, within the upper end of tube 40, and a plug 44 having a longitudinally extending hole 46 bored therethrough is securely positioned within the bottom end of tube 24 (which, as described previously, lies flush with bottom surface 26 of plate 14). Plug 44 includes a series of vertically extending grooves 45 formed on its sidewall which permit drainage of any water that may infiltrate tubes 24 and 40. A wire 48 passes entirely through tubes 24 and 40, and hence through hole 46 and the aperture formed through cap 42. The bottom end 50 of wire 48 is securely anchored to bottom surface 26 of plate 14 by being wound upon a screw 52 which threadingly engages the bottom surface of plate 14. The upper end 54 of wire 48 may be looped around or hooked upon branch 12, thereby securely maintaining bird feeder 10 in vertically spaced relation above the ground.

Cone 18 includes an open, flared end 56 formed at and extending upwardly from its vertex which is of a diameter slightly smaller than the OD of tube 40, thereby permitting cone 18 to be force (or interference) fit onto tube 24. Accordingly, cone 18, together with tube 40, is mounted for sliding movement along the longitudinal axis of tube 24. Cap 42, which is fixedly secured to tube 40 and cone 18, prevents cone 18 from becoming disassociated from tube 40. To maintain cone 18 in vertically spaced relation above plate 14, a plurality of elongated tines, denoted generally by reference numeral 58, are adjustably and fixedly secured at one end 60 to lid 30, via screws 62, with their opposite ends 64 having rollers 66 (alternatively, ends 64' of times 58' could simply be curved 66', shown in phantom in FIG. 3, to reduce friction with cone 18) rotatably attached thereto. Rollers 66 are each positioned in sliding, contacting relation to the inner surface of cone 18. By having the head of screws 62 engage tine 58, rather than having screws 62 extend through tines 58, each tine 58 may be longitudinally adjusted by loosening screws 62. Accordingly, the vertical distance separating cone 18 from plate 14 may be selectively adjusted by moving tines 58 towards or away from tube 24, thereby altering the position at which tine ends 64 engage cone 18.

Tines 58 are bent about an axis X—X (see FIG. 3) which extends transverse to their longitudinal axes, such that each tine slopes downwardly from end 60 towards end 64. In addition, tines 58 are fabricated from a resilient metal, thereby giving them spring-like characteristics. Therefore, if a downward force is applied to cone 18, as is illustratively represented by the arrow 68 in FIG. 2, cone 18, along with tube 40, will slide downwardly along the longitudinal axis of tube 24 with tines 58 deflecting downwardly and rollers 66 rolling along the inner surface of cone 18. As shown in phantom in FIG. 2, a predetermined amount of downwardly exerted force (e.g., equivalent to the weight of an average size squirrel) applied to cone 18 will cause it to become positioned in essentially complete covering relation to plate 14, thereby denying all access to the feed. Once the force is removed from cone 18, tines will spring back to their original positions, thereby re-positioning cone 18 to its vertically aligned relation above plate 14. Should cone 18 become positioned in covering relation to plate 14 due to some constant downward force being applied thereto (e.g., snow accumulating on cone 18), small birds such as sparrows, chickadees and the like will still have access to the feed as there is sufficient lateral clearance between the cone's lower edge and the periphery of the base plate to permit such access.

What is claimed is:

1. A bird feeder comprising:
    a) a first, elongated tube having a first longitudinal axis and first and second opposite ends;
    b) a second, elongated tube having a second longitudinal axis extending co-axially with said first longitudinal axis, and having third and fourth opposite ends, said second, elongated tube being positioned in telescopically engaging relation to said first, elongated tube;
    c) a plate securely attached to and extending radially outwardly from said first, elongated tube, adjacent said first end thereof, said plate having a first, planar surface;
    d) a feed holding can essentially centrally mounted to and extending upwardly from said first planar surface, said can having at least one opening formed therethrough, adjacent said first planar surface, whereby feed may pass through said opening;
    e) a cone having an open first end of a first predetermined diameter and an open second end of a second predetermined diameter larger than said first predetermined diameter, and a sidewall tapering outwardly from said open first end towards said open second end, said first end of said cone being fixedly secured to said second elongated tube with said sidewall tapering downwardly and outwardly from said third end of said second elongated tube towards said first end of said first elongated tube, said cone being positioned in vertically spaced relation above said plate; and
    f) a plurality of elongated, resilient tines having respective first and second opposite ends, said tines extending radially outwardly from said feed holding can with said tines' second ends being positioned in contacting, supporting relation to said sidewall of said cone, whereby said tines support said cone in vertically spaced relation to said plate.

2. The bird feeder of claim 1 and further comprising a hoop concentrically positioned upon and fixedly secured to said first, planar surface of said plate, said hoop being positioned in circumferential relation around said feed holding can.

3. The bird feeder of claim 2 wherein said hoop is fixedly attached to said first planar surface by a plurality of annularly spaced apart nails.

4. The bird feeder of claim 1 and further comprising a lid extending radially outwardly from said first elongated tube and being releasably positioned in covering relation to said feed holding can.

5. The bird feeder according to claim 4 wherein said lid includes a plurality of holes formed therethrough.

6. The bird feeder according to claim 4 wherein said first end of said tines are attached to said lid, said tines extending radially outwardly therefrom.

7. The bird feeder according to claim 6 wherein said tines slope downwardly from their said first ends towards their said second ends.

8. The bird feeder according to claim 7 wherein said second ends of said tines include rollers rotatably attached thereto, said rollers being positioned in contacting relation to said sidewall of said cone.

9. The bird feeder according to claim 1 and further including a wire having first and second opposite ends, said wire extending through said first and second elongated tubes.

10. The bird feeder according to claim 9 wherein said plate includes a second, planar surface and said first end of said wire is fixedly secured thereto.

11. The bird feeder according to claim 10 and further including a cap positioned within said third end of said second, elongated tube, and a plug positioned within said first end of said first, elongated tube, said cap and said plug having first and second passageways, respectively, extending therethrough which are co-linear with said longitudinal axes of said first and second elongated tubes, said wire extending through said first and second passageways.

12. The bird feeder according to claim 1 wherein said second end of each of said tines includes a roller rotatably attached thereto, said roller being positioned in contacting relation to said sidewall of said cone.

13. The bird feeder according to claim 1 wherein said second end of each of said tines is curved.

14. The bird feeder according to claim 1 and further including a funnel shaped feed diverter positioned concentrically atop said first planar surface of said plate and within said feed holding can, said feed diverter tapering outwardly and downwardly within said can, whereby as feed is dropped within said can, said feed diverter diverts the feed towards said at least one opening formed through said can.

* * * * *